US008461754B2

(12) United States Patent
Chowdhury et al.

(10) Patent No.: US 8,461,754 B2
(45) Date of Patent: Jun. 11, 2013

(54) HIGH EFFICIENCY GLASS HALOGEN LAMP WITH INTERFERENCE COATING

(75) Inventors: Ashfaqul Islam Chowdhury, Broadview Heights, OH (US); Leonard Edward Hoegler, Solon, OH (US); William Robert Wright, Russell, OH (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 12/643,543

(22) Filed: Dec. 21, 2009

(65) Prior Publication Data

US 2011/0148272 A1 Jun. 23, 2011

(51) Int. Cl.
*H01J 5/16* (2006.01)
*H01J 61/40* (2006.01)
*H01K 1/26* (2006.01)
*H01K 1/32* (2006.01)

(52) U.S. Cl.
USPC ........... 313/489; 313/110; 313/112; 313/315; 313/580

(58) Field of Classification Search
USPC ................. 313/630–643, 576–582, 489, 315, 313/316
See application file for complete search history.

(56) References Cited

U.S. PATENT DOCUMENTS

| 4,179,636 | A | * | 12/1979 | Janssen | 313/274 |
| 4,652,789 | A | * | 3/1987 | Kawakatsu et al. | 313/112 |
| 4,959,585 | A | * | 9/1990 | Hoegler et al. | 313/271 |
| 5,404,069 | A | * | 4/1995 | Olwert et al. | 313/279 |
| 5,962,972 | A | * | 10/1999 | Engels et al. | 313/578 |
| 2011/0109219 | A1 | * | 5/2011 | Kuepper | 313/344 |

* cited by examiner

Primary Examiner — Mariceli Santiago
(74) Attorney, Agent, or Firm — Fay Sharpe LLP (57) ABSTRACT

The disclosure provides a light-transmissive glass halogen filament tube with a filament light source having a coil concentricity ratio of not greater than 20% disposed therein, the filament tube having a multi-layer optical interference coating deposited on the outer surface thereof that transmits visible radiation from about 400-750 nm and reflects infra red radiation from about 800-2500 nm back to the filament for re-absorption, the coated filament tube exhibiting an LPW gain of at least 26%.

23 Claims, 6 Drawing Sheets

HIGH EFFICIENCY GLASS HALOGEN LAMP WITH INTERFERENCE COATING

BACKGROUND OF THE DISCLOSURE

The invention relates to a glass halogen filament tube comprising a multi-layer optical interference coating that functions to increase the efficiency of the filament tube by at least 26% as measured by LPW gain. It will be appreciated by those skilled in the art to which this invention pertains that selected aspects may find use in related applications where improvement of LPW and lamp life are of concern.

Halogen filament tubes are known. Generally, the premise of the halogen IR filament tube, sometimes referred to herein as a halogen IR lamp, is to provide a filament tube having a spectrally reflecting filter on the outside of the tube that functions to reflect a portion of the emitted IR radiation back to the filament, where a fraction of that reflected radiation is absorbed. The absorbed radiation improves filament tube performance by reducing the input electrical power needed to operate the filament tube at a constant filament temperature, i.e., it increases efficacy of the filament tube. The filter also is designed to optimally transmit as much of the visible radiation as possible in order to maintain not only lumen output, but also the color of the light generated by the filament tube.

Conventional halogen IR filament tubes are constructed using quartz as the envelope material. Quartz has been the material of choice for halogen IR filament tubes for several reasons, including its structural robustness, its stability at high temperatures of operation, and its compatibility with high temperature CVD (Chemical Vapor Deposition) coating processes. Filters or coatings are used to modify and/or enhance the performance characteristics of filament tubes. For example, U.S. Pat. No. 5,138,219 to our common assignee and incorporated herein by reference in its entirety, discloses an optical interference coating comprising alternating high and low refractive index material layers for transmitting visible radiation and reflecting IR radiation. Exemplary coatings are deposited on the outer surface of an envelope comprising a vitreous light-transmissive material, such as quartz, capable of withstanding high temperatures of about 800° C. The composition of the filter employed is critical to the goal of enhancing lamp performance. There are many different coating designs available today, and on many different types of lamps, to achieve not only very specific performance parameters for specialty lighting needs, but also to enhance the performance and life of lamps for more general every day uses. Even with the advantages gained using such coatings, quartz filament tubes continue to suffer from drawbacks due to expense, i.e., they can be costly to manufacture due not only to the cost of the materials, but also to the cost of processing at the high temperatures necessary when using quartz.

A more attractive filament tube material may be glass, given that glass is less expensive than quartz and is processed at lower temperatures. Even though glass potentially offers a more cost effective alternative, it is not widely used due to the susceptibility of the glass to experience structural failure when exposed to excessive film stress. Further, known glass lamps, even when coated to enhance performance, have not exhibited lumens per watt (LPW) gains of more than about 20%, and usually only achieve lesser gain.

What has not been known, therefore, is a glass halogen tube having deposited on the exterior surface thereof a high performance optical interference coating that transmits radiation in the visible portion of the spectrum, from about 400-750 nm, and reflects radiation in the infra-red portion of the spectrum, from about 800-2500 nm, wherein the glass filament tube operates at a temperature of about 600° C., without filament tube structural failure issues of the glass substrate related to excessive film stress caused by the interaction of the coating materials and the glass at operating conditions.

It would be desirable to provide a glass halogen, optical interference coated filament tube that with specified filament tube parameters, achieves measured LPW gains in excess of 26%, and even more than 30% LPW gain. In fact, the filament tubes of this invention, as compared to uncoated filament tubes of similar composition and structure, prepared to meet the specified ratings, have shown measured LPW gains of ~36%, which is almost a two-fold improvement in performance.

SUMMARY OF THE DISCLOSURE

In one embodiment, there is provided a light-transmissive glass halogen filament tube having disposed therein a filament light source having a coil concentricity ratio of not greater than 20%, the filament tube having a multi-layer optical interference coating on the outer surface thereof that transmits visible radiation from about 400-750 nm and reflects infra-red radiation from about 800-2500 nm back to the filament for re-absorption, the filament tube exhibiting a LPW gain of at least about 26%.

In another embodiment, there is provided a light-transmissive glass halogen filament tube having disposed therein a filament light source having a coil concentricity ratio of not greater than 20%, the filament tube having a multi-layer optical interference coating on the outer surface thereof that transmits visible radiation from about 400-750 nm and reflects infra-red radiation from about 800-2500 nm back to the filament for re-absorption, the filament tube exhibiting a LPW gain of at least about 26%, wherein the multi-layer coating comprises alternating first and second layers, the first layers having a relatively higher refractive index and the second layers having a relatively lower refractive index than the first layers. In yet another embodiment, the glass halogen filament tube operates at from about 6V to about 240V.

In still another embodiment, there is provided a configuration wherein an optical interference multi-layer coating is provided on a glass halogen filament tube, said configuration comprising:

a) a light-transmissive glass envelope having an outer surface and an inner surface, and including within the envelope at least one light source and a halogen fill gas;

b) the at least one light source positioned within the envelope such that it has a coil concentricity ratio of not greater than 20%; and c) a multi-layer optical interference coating provided by PVD or other processing on at least a portion of the outer surface of the envelope; wherein the optical interference coating is compatible with the glass envelope and the coating functions to provide LPW gain of the filament tube of at least about 26%.

In still another embodiment, there is provided a filament tube comprising:

a glass envelope housing a filament positioned therein to achieve a coil concentricity ratio of not greater than 20%, a multi-layer optical interference coating on at least a portion of an exterior surface of the envelope that substantially transmits visible radiation from about 400 nm to about 750 nm and substantially reflects infra-red radiation from about 800 nm to about 2500 nm;

wherein the filament tube satisfies the following relationship:

$1000 \leq x \leq 3000$;
$800 \leq y \leq 2000$; and
$18 \leq z \leq 30$;

wherein x corresponds to life in hours, y corresponds to lumens, and z corresponds to lumens per watt (LPW); and the filament tube exhibits a LPW gain of at least about 26%.

Still other features and benefits of the filament tube design, having a multi-layer optical interference coating in keeping with the parameters set forth herein will become apparent from reading and understanding the following detailed description, which will allow one skilled in the art to extrapolate the efficiency gain relationships presented to other glass halogen filament tube configurations.

DETAILED DESCRIPTION OF THE PREFERRED EMBODIMENTS

Throughout the specification, certain terms and phrases may be used that have the definitions provided herein. Those terms or phrases not defined will be attributed with the broadest meaning thereof as known to those of skill in the field of art to which the invention pertains. Approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context, for example includes a degree of error associated with the measurement of a particular quantity. In addition, "optional" or "optionally" means that the described material, event or circumstance may or may not be present or occur, and that the description includes instances where the event or material occurs/is present and also instances where the event or material does not occur/is not present. Singular forms such as "a", "an", and "the" include plural referents unless the context clearly dictates otherwise. All ranges disclosed herein are inclusive of the recited endpoints and are independently combinable. The phrases "adapted to," "configured to," and the like refer to elements that are sized, arranged, or manufactured to form a specified structure or to achieve a specified result. Finally, the terms "film" and "coating" may be used interchangeably herein, as well as the terms "filament tube" and "lamp".

As stated above, halogen filament tubes are known, and quartz has commonly been used in such filament tubes. Additionally, IR reflective coatings are known. What has not been known is the use of a high performance optical interference coating, that transmits radiation in the visible portion of the spectrum, from about 400-750 nm, and reflects radiation in the infra-red portion of the spectrum, from about 800-2500 nm, wherein the coating is deposited on a glass halogen tube, as opposed to more commonly employed quartz tubes, that operates at lower temperatures than comparable quartz tubes, of about 600° C., without experiencing the expected structural failure issues related to excessive film stress caused by the interaction of the coating materials and the glass.

In addition to the foregoing unique combination of a high performance multi-layer coating on a lower temperature glass halogen filament tube, the glass halogen tube herein contains a filament light source that is substantially centered within the tube, such that the filament has a coil concentricity ratio, CCR, of not greater than about 20%. The combined effect of the high performance optical interference coating being placed on the outer surface of the glass filament tube, and the filament itself being positioned within the tube such that the CCR is not greater than about 20%, is a filament tube that exhibits at least a lumen per watt, LPW, gain at given filament tube parameters in excess of at least about 25%.

Optical Interference Coating.

In one embodiment, the optical interference coating comprises a multi-layer optical interference coating having alternating layers of at least two high and low refractive index materials. As used herein, the terms "high refractive index" or "higher refractive index" and "low refractive index" or "lower refractive index" are understood to refer to the refractive index values of the materials used to form the alternating layers of the coating with respect to one another. "Material" as used with reference to the alternating layers of the optical interference coating may mean a material comprising a pure oxide component, such as $Ta_2O_5$, or may mean a material comprising multi metal oxides, such as NbTaOxide. Other suitable materials may include, but are not limited to, refractory metal oxides such as tantala, titania, niobia, silica, and like materials, including combinations of the foregoing. With regard to the use of higher and lower refractive index materials, in that instance where the various layers of the multi-layer optical interference coating include, for example, non-absorbing NbTaOxide and $SiO_2$, which have refractive indexes of 2.237 and 1.487, respectively, at 550 nm, the NbTaOxide material would be the "high or higher refractive index" material and the $SiO_2$ material would be the "low or lower refractive index" material.

The multi-layer optical interference coating must function at the operating temperature of the glass tube, for example at about 600° C., without destroying the glass by either tensional or compressive stress, and without experiencing physical or optical degradation of the coating. As such, suitable optical materials for use in the multi-layer optical interference coating are characterized by the capability of the materials to withstand the characteristic thermal conditions of lamp operation. Upon the selection of suitable high and low refractive index materials, the optical interference films are designed based on optical dispersion characteristics of the materials, and visible and infrared transmission and reflection targets (in terms of desired % transmittance within a specific spectral wavelength band) on the glass substrate. In one embodiment, a suitable design may substantially reflect light in the infra-red portion of the spectrum, between about 800 and 2500 nm, and substantially transmit light in the visible portion of the spectrum, between about 400-750 nm. In some embodiments, the optical interference coating may further include additional material layers that are suitable to aid in the transmittance or reflection of light in accord with the foregoing.

Figure 5:
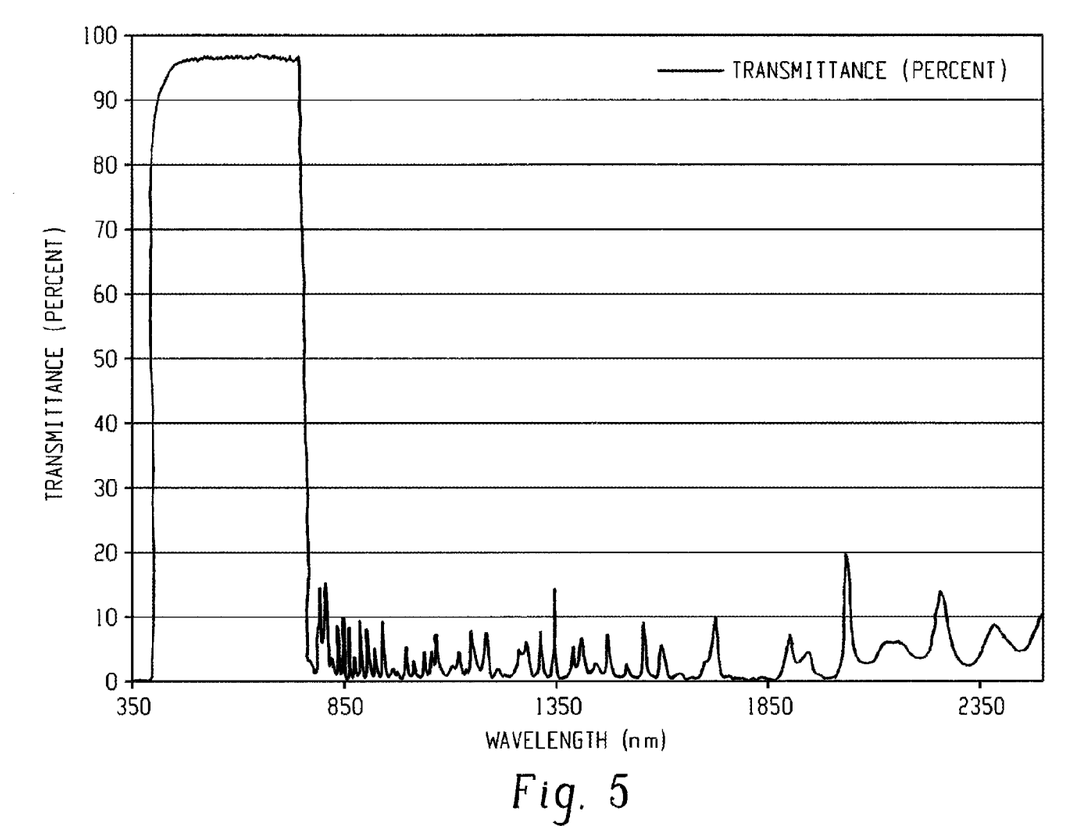
FIG. 5 is a graph of transmittance as a function of wavelength of a coated filament tube according to an embodiment of the disclosure.

In one embodiment, the multi-layer optical interference coating including at least two different refractive metal oxide materials may have at least 20 layers. Preferably, the multi-layer optical interference coating includes at least 60 layers, and even more preferably may include up to at least 210 alternating layers of refractory metal oxide materials. The thickness of the coating as a whole may be from about 3µ to about 25µ. The coating may be deposited by any known coating process, including known deposition techniques suitable for the deposition of refractory metal oxide material onto a glass substrate. In some embodiments, PVD is used to deposit the coating, though other deposition techniques, including for example ion beam assisted deposition, PECVD, vacuum thermal evaporation, ion plating, sputtering, CVD, plasma CVD, LPCVD, and others known to those skilled in the art may be used to obtain the compressive stress conditions in the optical interference coatings to meet the structural requirements in glass halogen lamp operation. Of these, PVD Reactive Sputtering is a preferred method. In some embodiments, the coating when deposited may be compressively stressed at about 50 MPa and up to about 400 MPa. As used herein, "compressively stressed" means that the multilayer film (coating) when deposited on the glass bulb is under compression as opposed to being under tension. The practical implication is that a film under tension tries to tear the glass bulb or tube apart (as in MOCVD films), while a film under compression tries to hold the bulb together (PVD films are generally compressive). The degree of stress in a film depends primarily on the processing conditions and the equipment used to deposit the film or coating. The stress measurement techniques for thin films are generally standardized and familiar to persons skilled in the art of optical thin film deposition. In some embodiments, it is only necessary that the film according to the invention (1) be slightly tensile to the limit of durability on the glass bulb or filament tube substrate, or be stress neutral, or comparable to the compression limits specified within the industry for commercially available lamp glasses, irrespective of deposition process/equipment used; and (2) also exhibit the necessary spectral performance. With regard to spectral performance, FIG. 5 provides a graph showing the spectral performance of an exemplary multi-layer optical interference coating in accord herewith, deposited on a glass halogen filament tube. As is seen, the coating is designed to transmit substantially all of the visible light generated by the filament tube, between 400-750 nm, about 96% in this case, and only up to about 20% of the infra-red light generated by the filament tube, between 800-2500 nm. The coating in this instance was a 210 layer, 18 micron thick PVD coating comprised of alternating higher and lower refractive index material layers of NbTaOxide and $SiO_2$, respectively. One skilled in the art of thin film interference coating design and optical thin film deposition, would be able, to convert the spectral performance depicted in FIG. 5 to design targets to be used in commercial thin film design software packages, such as Optilayer™ or TFCalc™, or other similar packages, to design equivalent films of different thickness and number of layers. The number of layers and total thickness of a film is dependent on the optical dispersion properties of the coating materials used.

Filament Tube.

In an embodiment, the filament tube may comprise glass, typically including silicates fused with boric oxide, aluminum oxide, or phosphorus pentoxide. Preferably, the filament tube comprises aluminosilicate glass, such as that commercially available from GE and known as GE 180™ glass, or borosilicate glass, also known commonly as Pyrex™ and Vycor™, available commercially from Corning. These materials, which are characterized by suitability for use at lamp operating temperatures of about 600° C., generally have a lower operating temperature than other commonly used lamp envelope materials, such as quartz, which has an operating temperature of about 800° C. or higher for lamp purposes, and are commonly referred to as high temperature vitreous materials. According to some embodiments, the glass filament tube, when coated with the high performance multi-layer optical interference coating as described herein, does not visibly, structurally, or functionally degrade due to either tensional or compressive stresses as the glass heats up to and is maintained at operating temperatures for prolonged periods. Specifically, even after prolonged lamp operation, in excess of 200 hours, the multi-layer optical interference coating is observed to adhere to the glass filament tube surface without peeling or disturbing the glass tube surface, and without experiencing delamination between layers of the coating. Typically, within the industry, lamp coatings that are substandard show signs of degradation within a 24 hour window of burn time, and usually much sooner.

While compressively stressed multi-layer films have been used on glass substrates, the adaptation of a multi-layer optical interference film or coating for use on a glass halogen filament tube as set forth herein provides unexpected performance advantages with regard to efficiency and/or longevity of the lamp.

As known to those skilled in the art, a glass halogen filament tube is generally dosed with a fill gas that is a mixture of an inert gas, such as Kr, Xe, Ar or any mixture thereof, and a halogen containing species, such $CH_3Br$ or HBr or other halogen containing compounds or any mixtures thereof. The fill gas is dosed into the filament tube at cold fill pressures generally between 2-6 atm. The efficacy of the filament tube is a function of the fill gas pressure and composition. As such, in accord with the graphical illustration provided in FIG. 2 and the performance and operating parameters set forth in Table 1, along with filament and bulb dimensions and fill gas properties provided in the following paragraphs, one skilled in the art will be able to extrapolate the same to achieve other fill conditions and tube and filament geometries.

Figure 1:
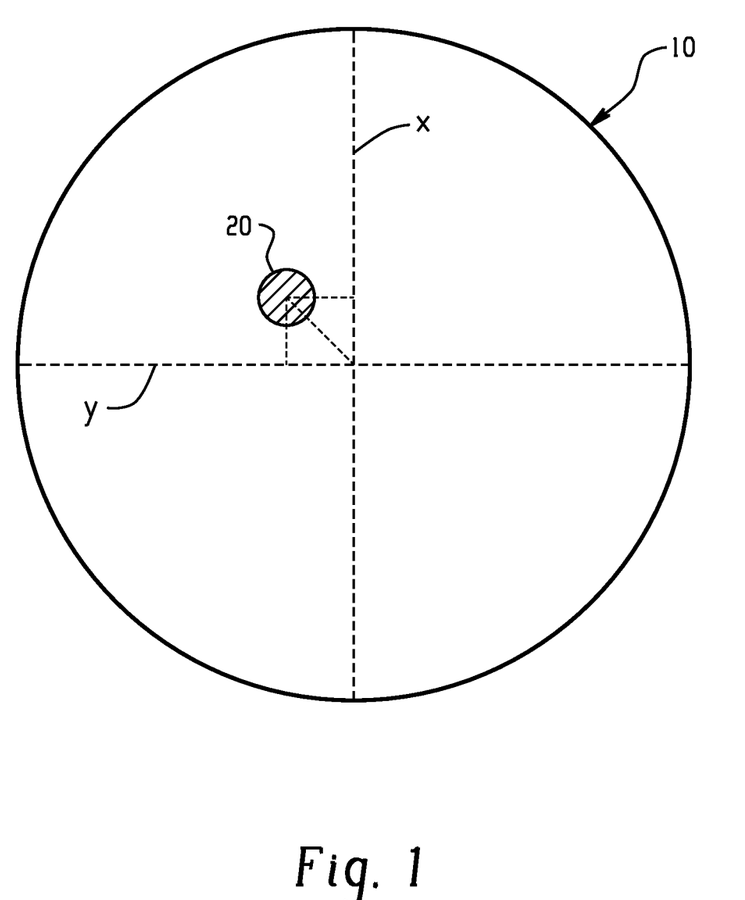
FIG. 1 is a filament tube cross section showing the measurement of CCR according to an embodiment of the disclosure.
Figure 6:
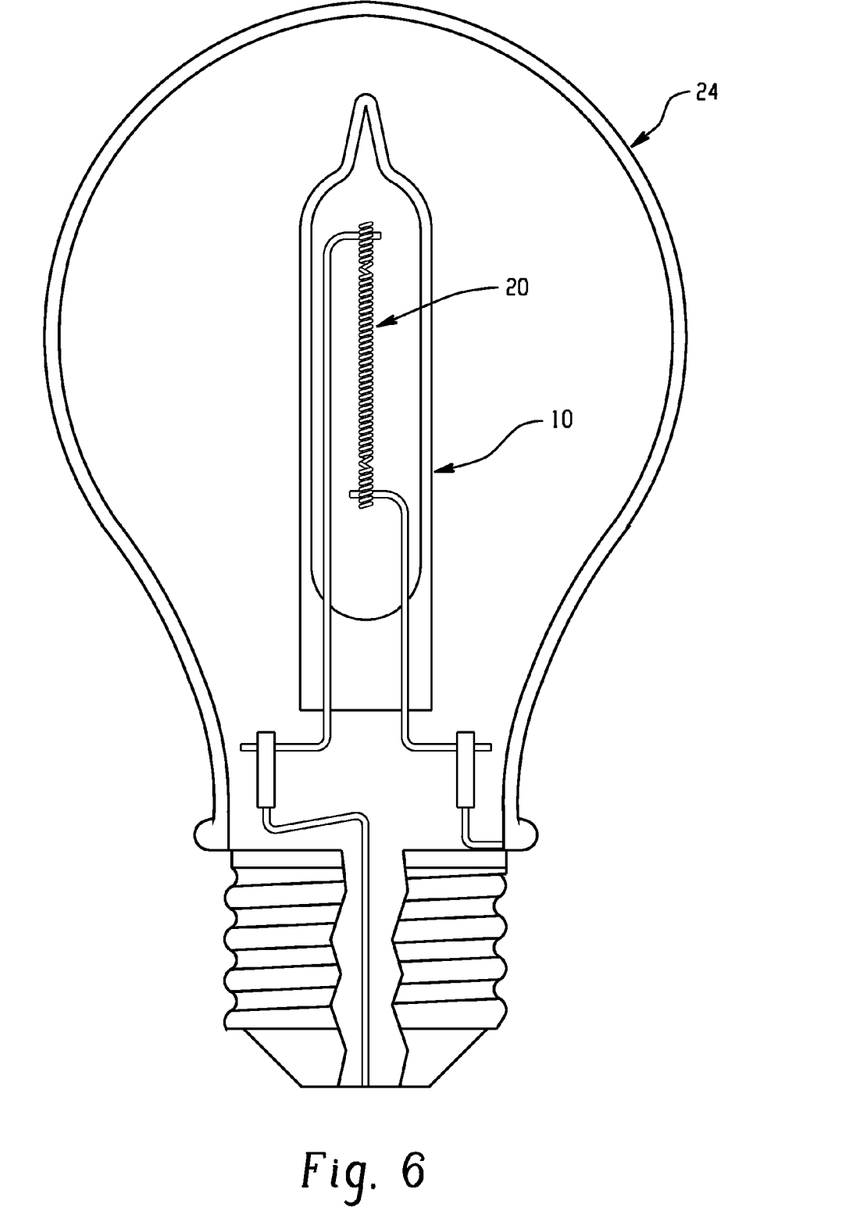
FIG. 6 is an illustration of an A19 medium base lamp including a filament tube according to an embodiment of the disclosure

Filament. In one embodiment, the filament may comprise any known filament material, such as tungsten, tantalum, or carbon, or a mixture or composite thereof, among others. In FIG. 1, the filament is shown to have a coiled coil design. In this type of coil design for filament tubes coated with optical interference coatings, the geometry of the filament isoptimized, thus increasing the opportunity for the filament to re-absorb infrared radiation reflected by the optical interference coating. Given that the multi-layer optical interference coating disclosed herein reflects up to about 80% of the infra-red radiation generated by the filament, it is important to optimize the filament geometry in order to take advantage of the opportunity to re-absorb the reflected radiation. Generally, the coiled coil filament design optimally includes multiple primary coils of the filament wherein the distance between each primary coil is substantially the same and the size of each primary coil is substantially equal to that of every other primary coil. The multiple primary coils are wound into secondary multiple coil turns wherein the distance between each secondary coil turn is substantially the same and the size of each secondary coil turn is substantially equal to that of every other secondary coil turn. In one embodiment, where a glass halogen filament tube is used as a light source in a reflector assembly, the extension of the filament tube into the reflector assembly is specified by reflector design requirements with respect to the light center length of the filament within a reflector lamp. "Light center length" as used herein refers to the positioning of the center of the coil with respect to the focal point of the outer reflector, for example in a reflector such as that shown in FIG. 4. In another embodiment, where a glass halogen filament tube is used as a light source in an A19 medium base assembly, the coated glass halogen filament tube replaces the tungsten filament as would be found in a standard incandescent A19 lamp, for example in an A19 lamp such as that shown in FIG. 6. As a non-limiting example of the foregoing, in a reflector in keeping with that shown in FIG. 4 and an A19 lamp as shown in FIG. 6, the stretched coiled coil length may be about 14 mm. With regard to the secondary coils, there may be included 32 secondary turns, or 57.4 secondary turns per inch, and the secondary coil diameter may be about 1.14 mm. With regard to the primary coils, the filament may include about 271 primary coils per inch, wherein the primary coil diameter is about 0.25 mm. In this design, the filament wire size may be about 0.06 mm, and have an active filament length of about 585 mm.

Coil Concentricity Ratio.

With further regard to the filament, and in addition to the foregoing unique combination of a high performance multi-layer coating on a lower temperature glass halogen filament tube, the glass halogen tube herein contains a filament light source that is substantially centered within the tube, such that the filament has a coil concentricity ratio, CCR, of not greater than about 20%. CCR is calculated according to the following:

$$CCR = \frac{\text{avg. coil offset from bulb center line}}{\text{coil outer diameter}} \times 100$$

These measurements may be taken automatically using a vision system for the centrally located coil turns, as is known in the art. The center line of the coil turn and the center line of the tube are found in the zero degree-plane, and the distance between them is calculated at each turn. The offsets for these coil turns are then averaged. The filament tube is then rotated 90° and the process repeated. Finally, using the Pythagorean Theorem, the average coil turn offset from the tube center line is found according to the following equation:

Average Offset Both Planes=$((\text{avg. offset } 0° \text{ plane})^2 + (\text{avg. offset } 90° \text{ plane})^2)^{1/2}$, which is shown in FIG. 1. This value is then used in the equation set forth above to determine the CCR. FIG. 1 provides a filament tube 10 cross-sectional view, including filament 20, showing the CCR measurement. In this FIG. 1, "x" corresponds to the 0° plane and "y" corresponds to the 90° plane, as set forth in the above equation.

The combined effect of the high performance optical interference coating being placed on the outer surface of the glass filament tube, and the filament itself being positioned within the tube such that the CCR is not greater than about 20%, is a glass halogen filament tube that exhibits at least a lumens per watt (LPW) i.e. efficiency design space in keeping with that set forth in Table 1 below, and as shown graphically in FIG. 2. More particularly, in one embodiment there is provided a glass halogen filament tube, operating for example at 120V, and housing a filament positioned therein to achieve a coil concentricity ratio of not greater than 20%, the filament tube being coated with a multi-layer optical interference coating, deposited on at least a portion of an exterior surface of the filament tube, such that the filament tube satisfies the following relationship:

$1000 \leq x \leq 3000$;

$800 \leq y \leq 2000$; and $18 \leq z \leq 30$;

wherein x corresponds to lamp life in hours, y corresponds to lumens, and z corresponds to lumens per watt (LPW), such that the filament tube exhibits a LPW gain, as compared to a similar uncoated filament tube, of at least 26%. For example, the filament tube may include a glass bulb having a diameter of about 10 mm, and contain a xenon- or krypton-plus halogen fill, at a cold fill pressure of about 4000 torr. The filament in such a filament tube may be a tungsten filament, for example, and have a lighted filament length of from about 9 to about 15 mm. One skilled in the art will be able to utilize the data in Table 1, in conjunction with the graphical representation of that data, as well as the CCR parameter of not greater than 20%, to manufacture a filament tube having different filament tube diameters, coil configuration and type, and reflector configuration. Similarly, the data presented herein may be used to enhance specific features of filament tube performance. For example, one may choose to vary or hold constant one parameter, such as lamp life, lumens or power, among others, in order to optimize a different parameter.

Figure 2:
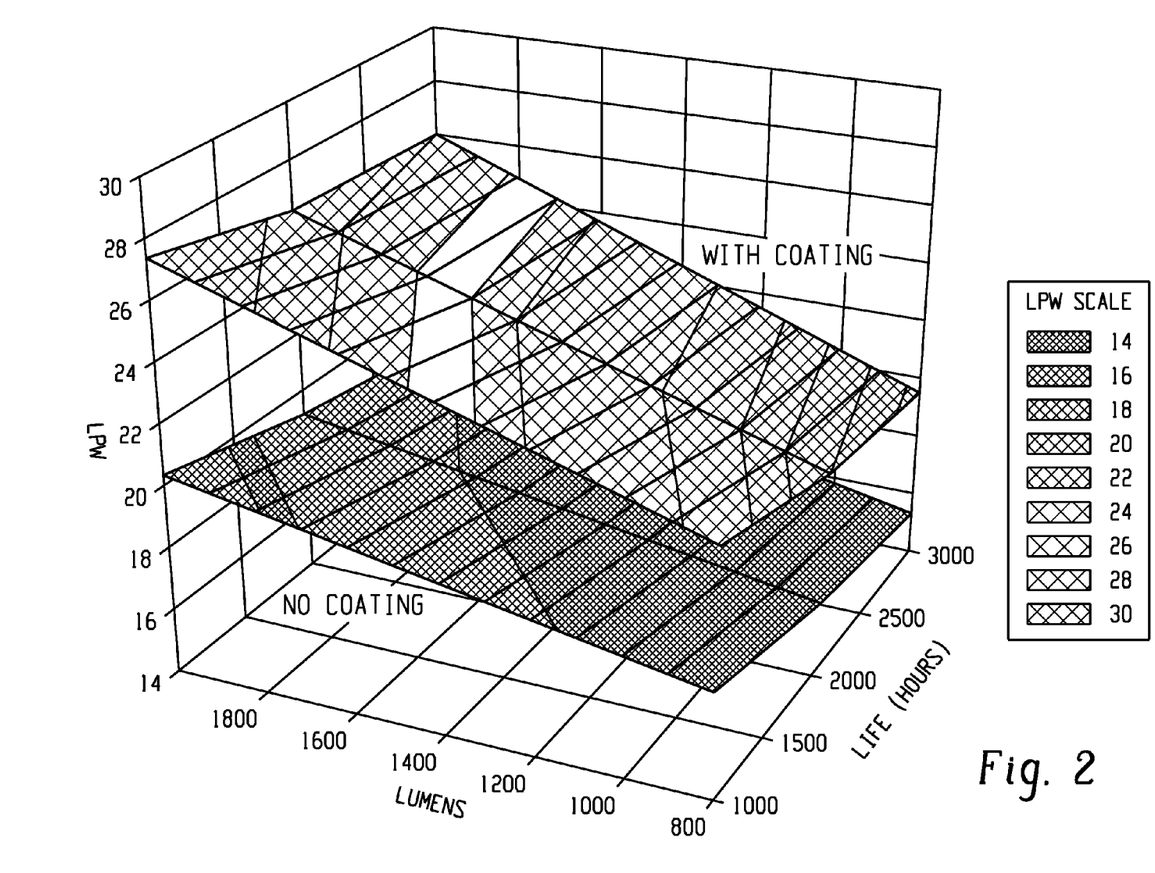
FIG. 2 is a 3-dimensional graph providing a glass halogen LPW comparison as a function of life, lumens and LPW according to an embodiment of the disclosure.

A filament tube in keeping with the foregoing, and corresponding to those filament tubes used to generate the data presented in Table 1 and FIG. 2, may when coated bear a 210 layer, 18 micron thick coating of alternating layers of higher and lower refractive index materials such as NbTaOxide and $SiO_2$, respectively.

TABLE 1

IR % LPW Gain - Comparing IR Coated to Non IR Coated Glass Halogen Designs at 120 volts holding Lumens and Life Constant.

| | Glass Halogen IR Coated | | | | Glass Halogen Non IR Coated | | | | $LPW_{ir}/LPW_{nonir}$ |
|---|---|---|---|---|---|---|---|---|---|
| Fill Gas | Life | Watts | Lumens | LPW | Life | Watts | Lumens | LPW | IR % LPW Gain |
| Xenon | 1000 | 72 | 1971 | 27.38 | 1000 | 95.8 | 1971 | 20.57 | 33.06 |
| Krypton | 1000 | 72 | 1929 | 26.79 | 1000 | 96.5 | 1929 | 19.99 | 34.03 |
| Xenon | 2000 | 72 | 1854 | 25.75 | 2000 | 98 | 1854 | 18.92 | 36.11 |
| Krypton | 2000 | 72 | 1814 | 25.19 | 2000 | 98.7 | 1814 | 18.38 | 37.08 |
| Xenon | 3000 | 72 | 1789 | 24.85 | 3000 | 99.3 | 1789 | 18.02 | 37.92 |
| Krypton | 3000 | 72 | 1751 | 24.32 | 3000 | 100.2 | 1751 | 17.48 | 39.17 |
| Xenon | 1000 | 53 | 1281 | 24.17 | 1000 | 68.6 | 1281 | 18.67 | 29.43 |
| Krypton | 1000 | 53 | 1250 | 23.58 | 1000 | 69 | 1250 | 18.12 | 30.19 |
| Xenon | 2000 | 53 | 1193 | 22.51 | 2000 | 69.7 | 1193 | 17.12 | 31.51 |

TABLE 1-continued

IR % LPW Gain - Comparing IR Coated to Non IR Coated Glass Halogen
Designs at 120 volts holding Lumens and Life Constant.

| Fill Gas | Glass Halogen IR Coated | | | | Glass Halogen Non IR Coated | | | | $LPW_{ir}/LPW_{nonir}$ |
|---|---|---|---|---|---|---|---|---|---|
| | Life | Watts | Lumens | LPW | Life | Watts | Lumens | LPW | IR % LPW Gain |
| Krypton | 2000 | 53 | 1163 | 21.94 | 2000 | 70.1 | 1163 | 16.59 | 32.26 |
| Xenon | 3000 | 53 | 1144 | 21.58 | 3000 | 70.4 | 1144 | 16.25 | 32.83 |
| Krypton | 3000 | 53 | 1115 | 21.04 | 3000 | 70.8 | 1115 | 15.75 | 33.58 |
| Xenon | 1000 | 43 | 985 | 22.91 | 1000 | 54.5 | 985 | 18.07 | 26.74 |
| Krypton | 1000 | 43 | 959 | 22.30 | 1000 | 54.7 | 959 | 17.53 | 27.21 |
| Xenon | 2000 | 43 | 912 | 21.21 | 2000 | 55.1 | 912 | 16.55 | 28.14 |
| Krypton | 2000 | 43 | 887 | 20.63 | 2000 | 55.3 | 887 | 16.04 | 28.60 |
| Xenon | 3000 | 43 | 871 | 20.26 | 3000 | 55.4 | 871 | 15.72 | 28.84 |
| Krypton | 3000 | 43 | 847 | 19.70 | 3000 | 55.7 | 847 | 15.21 | 29.53 |

Table 1 provides Life, Watts, and Lumen data for two sets of glass halogen filament tubes with identical bulb diameters (10 mm). One set bears the multi-layer optical interference coating (IR Coated) disclosed herein along with the tungsten coiled coil filament designs to meet the specified ratings, and the other set has no coating (Non-IR Coated) along with the tungsten coiled coil filament designs to meet the specified ratings. In addition, LPW data is provided for each filament tube designed. The LPW data for each filament tube set is then used to calculate the LPW Gain, shown in the far right hand column. As can be seen, the IR Coated filament tubes exhibited a LPW gain over the non-IR coated filament tubes of at least 26.74%, and well above this up to even 39.17%. Table 1 further sets forth data for two different fill gases (Xenon and Krypton), and all filament tubes were designed at 120 volts, to meet the specified ratings. "Ratings" as used here refers to the life and lumens of a particular filament tube design, as would be understood by one skilled in the art.

A subset of the same data shown in Table 1 is plotted in FIG. 2, titled GH LPW Comparison, as a graphical illustration. The lower shaded area represents a non-IR coated filament tube, and the upper shaded area represents the corresponding IR coated filament tube in accord with an embodiment of the disclosure. The filament tubes used to generate the data shown in Table 1 and FIG. 2 were of the filament tube design shown in FIG. 3, and had a filament tube diameter of 10 mm, included a coiled coil tungsten filament with a 14 mm lighted filament length, a krypton plus halogen fill, with a cold pressure fill of 4000 torr, and were designed at 120V. Based on the foregoing parameters, one skilled in the art would be able to extrapolate the efficiency gain relationships to other tubular glass halogen filament tube configurations, as well as to filament tubes operating at voltages other than 120V.

Figure 3:
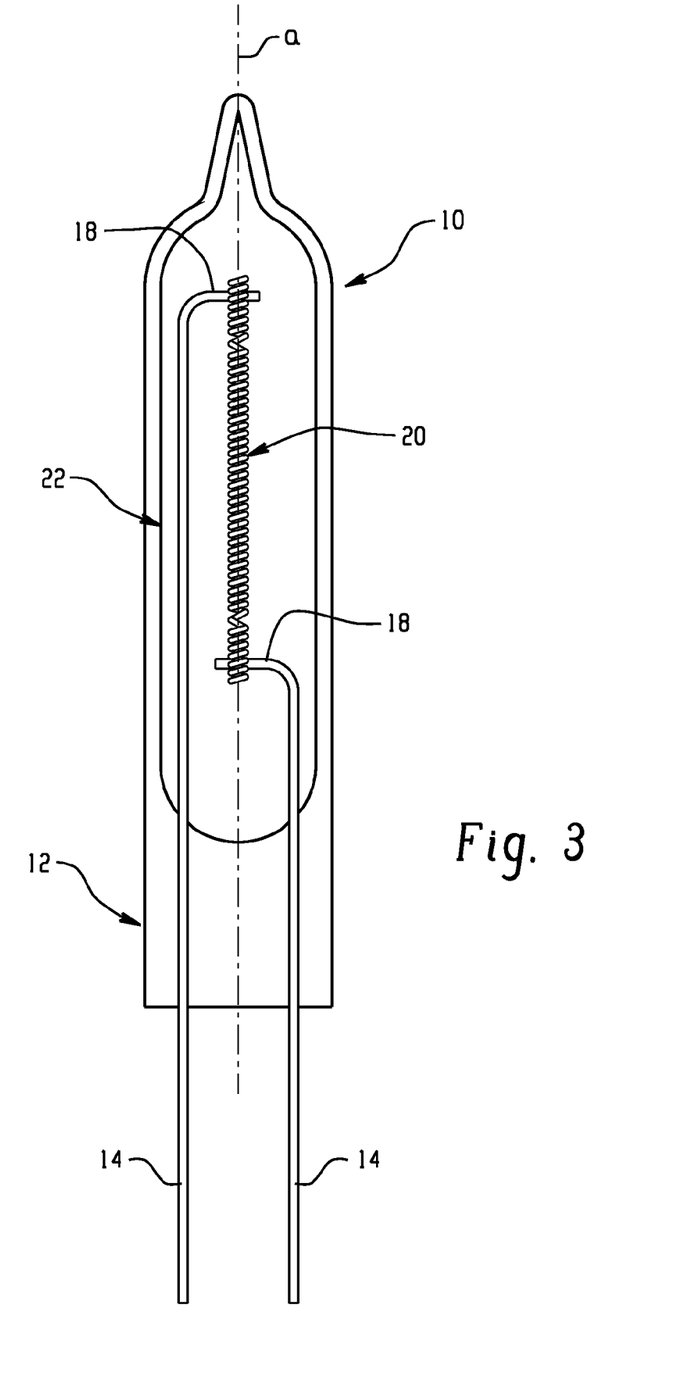
FIG. 3 is an illustration of a filament tube according to an embodiment of the disclosure.
Figure 4:
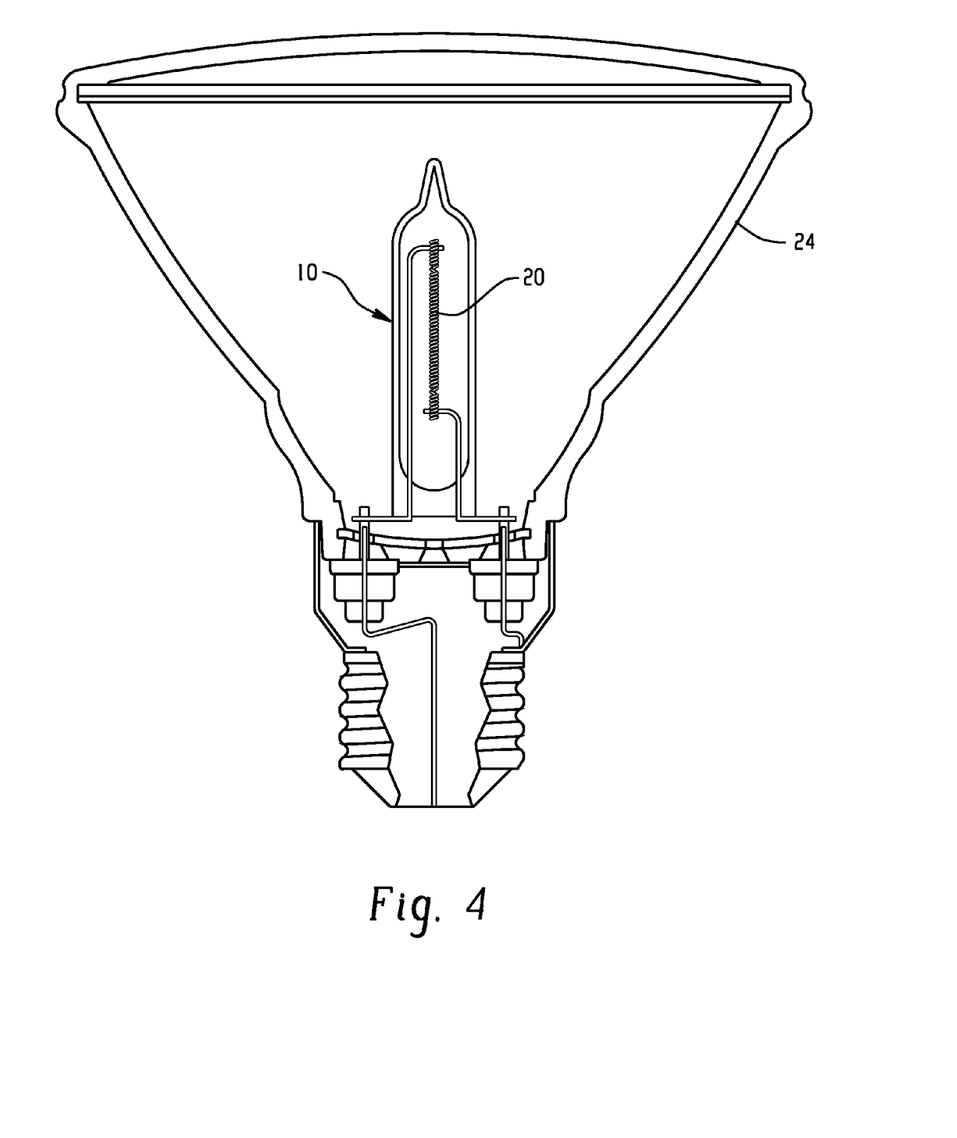
FIG. 4 is an illustration of a reflector including a filament tube according to an embodiment of the disclosure.

The glass halogen filament tube of FIG. 3, in accord with an embodiment, includes a filament tube 10, made substantially out of light transmissive glass material capable of operating efficiently at about 600° C. One end, the lead in end, the filament tube 10 has a pinch seal portion 12 through which two leads 14 are sealed that are electrically and mechanically attached by suitable means to the filament ends. The filament and lead assembly is hermetically sealed within the filament tube with the leads exposed on one end of the filament tube beyond the pinch seal. Leads 18 are made out of a suitable conductive material and are attached to the ends of the filament 20 which may be composed of tungsten, carbon or other conductive material. The filament 20 is positioned within the filament tube 10 to extend substantially along the longitudinal axis of the tube, a, such that it has a coil concentricity ratio of not greater than 20%. Depending on the length of tube 10, filament 20 may be supported by suitable supporting members, not shown, in order to retain the filament substantially along the longitudinal axis a. Disposed on at least a portion of the outer surface of filament tube 10 is multi-layer optical interference coating 22. Although FIG. 3 illustrates a single ended filament tube design, the practice of the invention is equally applicable to other filament tube designs, including but not limited to double-ended filament tube designs. FIG. 4 sets forth a reflector 24 design in which a filament tube 10 of the type shown in FIG. 3 may be used. Though the filament tube in the FIG. 4 reflector design is in keeping with that shown in FIG. 3, in light of the design parameters and data provided herein, particularly with reference to Table 1 and FIG. 2, one skilled in the art will appreciate the use of filament tubes of other configurations, as well as additional reflector designs, without departing from the scope of the invention.

With reference again to FIG. 2, there is provided a plot showing axes in three dimensions, x, y, and z. In this plot, the x axis corresponds to Life in Hours, they axis corresponds to Lumens, and the z axis corresponds to Lumens Per Watt (LPW). Values on each axis are calculated, taking into consideration the various design parameters of the particular filament tube, in order to determine the threshold values necessary for a filament tube in accord herewith to exhibit a lumens per watt gain (LPW Gain) in excess of at least 26%, wherein LPW Gain is defined as:

$$\text{LPW Gain} = (LPW_{coated} - LPW_{no\ coating})/LPW_{no\ coating}$$

where the LPWs are for filament tubes designed for the same lumen and life ratings.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A glass halogen filament tube comprising a light-transmissive glass filament tube with a filament light source having a coil concentricity ratio of not greater than 20% disposed therein, the filament tube having a multi-layer optical interference coating deposited on the outer surface of the filament tube that transmits visible radiation at greater than 92% from about 400-750 nm and reflects infra-red radiation at greater than 80% from about 800-2500 nm back to the filament for re-absorption, the coated filament tube exhibiting an LPW gain of at least 26%;

wherein the multi-layer optical interference coating comprises at least 210 layers; and wherein the multi-layer optical interference coating has a thickness of from about 3μ to about 25μ.

2. The filament tube of claim 1 operating at about 120V.

3. The filament tube of claim 1 wherein the glass filament tube comprises at least one of aluminosilicate and borosilicate.

4. The filament tube of claim 1 wherein the filament comprises at least one of tungsten, tantalum, carbon, or mixtures or combinations of conductive materials including at least one of tungsten or carbon.

5. The filament tube of claim 4 wherein the filament has a surface area of at least about 60 mm$^2$ and a coil concentricity ratio of not greater than 20%.

6. The filament tube of claim 1 wherein the fill gas includes a mixture of an inert gas such as Kr, Xe, Ar or a mixture thereof and a halogen containing species such $CH_3Br$ or HBr or other halogen containing compounds or a mixture thereof.

7. The filament tube of claim 1 wherein the multi-layer coating comprises alternating first and second layers, said first layers having relatively higher refractive index and said second layers having relatively lower refractive index than said first layers.

8. The filament tube of claim 1 operating at about 220V.

9. The filament tube of claim 1 operating at 6-240V.

10. The filament tube of claim 1 wherein the multi-layer coating comprises alternating first and second layers, said first layers having relatively higher refractive index and said second layers having relatively lower refractive index than said first layers.

11. The filament tube of claim 1 wherein the coating scatters light energy at a reduced rate as compared to similar filament tubes without said coating.

12. A configuration providing an optical interference multi-layer coating on a glass halogen filament tube, said configuration comprising:
   a) a light-transmissive glass envelope having an outer surface and an inner surface, and including within said envelope at least one light source and a halogen fill gas;
   b) said at least one light source positioned within the envelope such that it has a coil concentricity ratio of not greater than 20%; and
   c) a multi-layer optical interference coating provided by PVD or other processing on at least a portion of the outer surface of the envelope that transmits visible radiation at greater than 92% from about 400-750 nm and reflects infra-red radiation at greater than 80% from about 800-2500 nm back to the filament for re-absorption;
   wherein said optical interference coating is compatible with the glass envelope and the coating functions to provide LPW gain of the filament tube of at least about 26%;
   wherein the multi-layer optical interference coating comprises at least 210 layers; and
   wherein the multi-layer optical interference coating has a thickness of from about 3μ, to about 25μ.

13. A filament tube comprising:
a glass envelope housing a filament positioned therein to achieve a coil concentricity ratio of not greater than 20%,
a multi-layer optical interference coating on at least a portion of an exterior surface of the envelope that transmits visible radiation at greater than 92% from about 400 nm to about 750 nm and reflects infra-red radiation at greater than 80% from about 800 nm to about 2500 nm;
wherein the filament tube satisfies the following relationship:
$1000 \leq x \leq 3000$;
$800 \leq y \leq 2000$; and
$18 \leq z \leq 30$;
wherein x corresponds to life in hours, y corresponds to lumens, and z corresponds to lumens per watt (LPW);
the filament tube exhibits a LPW gain of at least about 26%;
wherein the multi-layer optical interference coating comprises at least 210 layers; and
wherein the multi-layer optical interference coating has a thickness of from about 3μ to about 25μ.

14. The filament tube of claim 13 wherein the filament tube is operated at 120V, watts are held constant at 72, and when x is 1000, z is from about 26 to about 28.

15. The filament tube of claim 13 wherein the filament tube is operated at 120V, watts are held constant at 72, and when x is 2000, z is from about 25 to about 26.

16. The filament tube of claim 13 wherein the filament tube is operated at 120V, watts are held constant at 72, and when x is 3000, z is from about 24 to about 25.

17. The filament tube of claim 13 wherein the filament tube is operated at 120V, watts are held constant at 53, and when x is 1000, z is from about 23 to about 25.

18. The filament tube of claim 13 wherein the filament tube is operated at 120V, watts are held constant at 53, and when x is 2000, z is from about 21 to about 23.

19. The filament tube of claim 13 wherein the filament tube is operated at 120V, watts are held constant at 53, and when x is 3000, z is from about 20 to about 22.

20. The filament tube of claim 13 wherein the filament tube is operated at 120V, watts are held constant at 43, and when x is 1000, z is from about 22 to about 23.

21. The filament tube of claim 13 wherein the filament tube is operated at 120V, watts are held constant at 43, and when x is 2000, z is from about 20 to about 22.

22. The filament tube of claim 13 wherein the filament tube is operated at 120V, watts are held constant at 43, and when x is 3000, z is from about 19 to about 21.

23. The filament tube of claim 13 wherein the filament tube diameter is about 8-13 mm.

* * * * *